United States Patent
Lim

(10) Patent No.: US 7,379,803 B2
(45) Date of Patent: May 27, 2008

(54) ELECTRONIC CONTROL POWER STEERING CONSIDERING TILT POSITION OF STEERING COLUMN

(75) Inventor: Choul-Hoon Lim, Kyunggi-do (KR)

(73) Assignee: Hyundai Mobis Co., Ltd, Yongin-shi (KR)

( * ) Notice: Subject to any disclaimer, the term of this patent is extended or adjusted under 35 U.S.C. 154(b) by 539 days.

(21) Appl. No.: 11/000,085

(22) Filed: Dec. 1, 2004

(65) Prior Publication Data

US 2005/0119811 A1    Jun. 2, 2005

(30) Foreign Application Priority Data

Dec. 1, 2003    (KR) .................. 10-2003-0086226

(51) Int. Cl.
*A01B 69/00* (2006.01)
*B62D 5/04* (2006.01)

(52) U.S. Cl. ........................... 701/41; 180/444

(58) Field of Classification Search .............. 701/41, 701/42; 180/443, 423, 446, 444
See application file for complete search history.

(56) References Cited

U.S. PATENT DOCUMENTS

| 5,460,235 | A | * | 10/1995 | Shimizu | 180/446 |
|---|---|---|---|---|---|
| 5,810,111 | A | | 9/1998 | Takeuchi et al. | |
| 6,499,557 | B2 | | 12/2002 | Takai et al. | |
| 6,501,023 | B2 | * | 12/2002 | Tsunoda et al. | 174/72 A |
| 6,637,284 | B1 | | 10/2003 | Gaeth | |
| 6,711,965 | B2 | * | 3/2004 | Tomaru et al. | 74/493 |
| 2002/0124677 | A1 | * | 9/2002 | Tomaru et al. | 74/493 |
| 2003/0102181 | A1 | * | 6/2003 | Tokumoto | 180/446 |
| 2003/0121717 | A1 | * | 7/2003 | Tokumoto | 180/446 |

* cited by examiner

*Primary Examiner*—Mark Hellner
(74) *Attorney, Agent, or Firm*—Greenblum & Bernstein, P.L.C.

(57) ABSTRACT

An electronic control power steering having a control unit for electronic control includes a tilt sensor that detects a tilt angle of a steering column, and a logic, provided in the control unit, that adjusts a power assist for steering according to signals received from the tilt sensor.

5 Claims, 1 Drawing Sheet

[FIG. 1]
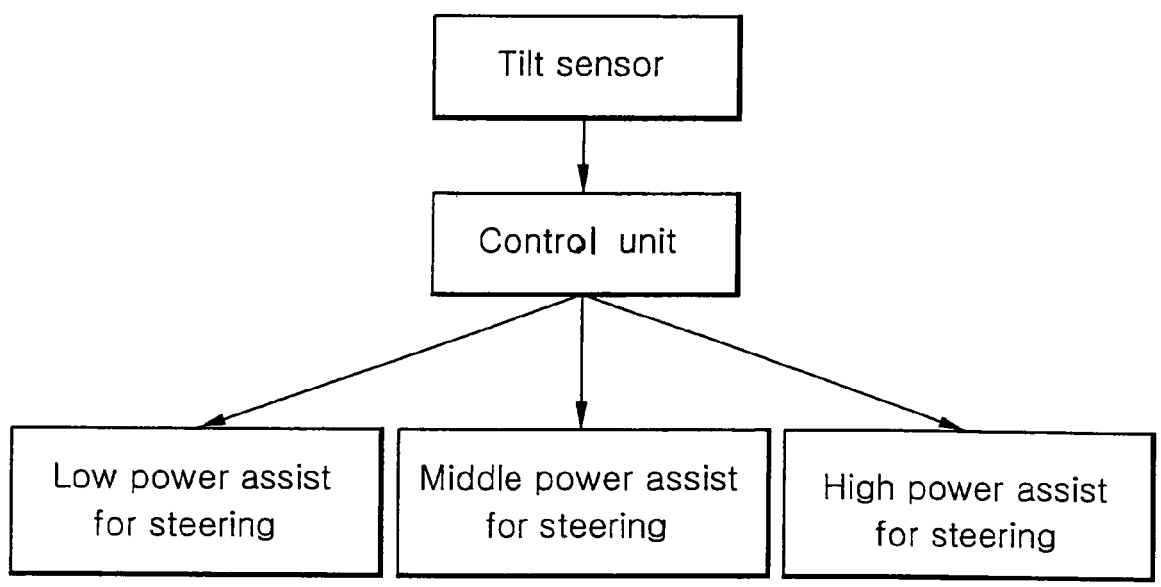

ELECTRONIC CONTROL POWER STEERING CONSIDERING TILT POSITION OF STEERING COLUMN

RELATED APPLICATIONS

The present disclosure relates to subject matter contained in priority Korean Application No. 10-2003-0086226, filed on Dec. 1, 2003, which is herein expressly incorporated by reference in its entirety.

BACKGROUND OF THE INVENTION

1. Field of the Invention

The present invention relates to a power steering, and particularly to an electronic control power steering including a control unit for electronic control, and more particularly to an electronic control power steering having different power-assist for steering according to a tilt angle of a steering column.

2. Description of the Related Art

A power steering is broadly used as a system capable of providing power assist for steering to the driver so as to be able to turn a vehicle with a weak hand-operated force of a steering wheel. Here, there are two modes according to a power source, one for a hydraulic pump mode and the other for an electric motor mode. In particular, the power steering controlled electronically and automatically is called an electronic control power steering.

As the conventional electronic control power steering, one example of the electric motor mode is disclosed in U.S. Pat. No. 5,810,111, and one example of the hydraulic pump mode is disclosed in U.S. Pat. No. 6,499,557.

The control unit included in the conventional electronic control power steering has logic capable of sensing a vehicular speed from a signal of a vehicular speed sensor and then controlling power assist for steering according to the sensed result. Thus, the control unit is generally a speed sensitive typed one providing the power assist for steering at a low speed. The conventional power steering is simply capable of controlling the power assist for steering according to the speed in this manner, but not controlling the power assist for steering according to a condition of driver's body.

Meanwhile, the steering column is generally provided with a tilt system so that the driver can adjust a location of the steering wheel according to a condition of his/her own body. One example of the tilt system is disclosed in U.S. Pat. No. 6,637,284.

SUMMARY OF THE INVENTION

To solve the above-indicated problems, it is, therefore, an objective of the present invention to provide an electronic control power steering capable of differentiating power assist for steering according to a condition of driver's body. For instance, in the case of the driver having a good body (e.g., a male adult, etc.), the power assist for steering is provided to a weak extent, while in the case of the driver having a bad body (e.g., an aged person, etc.), the power assist for steering is provided to a strong extent. In this manner, when the power assist for steering is differentiated according to the condition of the driver's body, it is possible to acquire a preferable effect in the aspect of energy efficiency.

To achieve the above objectives, an electronic control power steering has a control unit for electronic control and comprises a tilt sensor detecting a tilt angle of a steering column, and a logic provided in the control unit and adjusting power assist for steering according to a signal received from the tilt sensor.

BRIEF DESCRIPTION OF THE DRAWINGS

The above objects, features and advantages of the present invention will become more apparent from the following detailed description when taken in conjunction with the accompanying drawings, in which:

FIG. 1 is a block diagram showing a preferred embodiment of the invention.

DETAILED DESCRIPTION OF THE PREFERRED EMBODIMENT

A preferred embodiment of the present invention will now be described with reference to the accompanying drawings. In the following description the same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

An electronic control power steering having a control unit for electronic control comprises a tilt sensor detecting a tilt angle of a steering column, and a logic provided in the control unit adjusting power assist for steering according to a signal received from the tilt sensor.

Here, the tilt sensor is for detecting the tilt angle of the steering column, and has no limitation as long as the tilt angle of the steering column may be detected to output an electrical signal. For example, the tilt sensor may be one disclosed in U.S. Pat. No. 6,637,284.

The steering column is tilted upward if a driver has a good body, while the steering column is tilted downward if the driver is a bad body. Therefore, it is possible to have an indirect acknowledge of the condition of the driver's body from the tilt angle of the steering column.

A signal outputted from the tilt sensor is inputted into the control unit. The logic is provided to control the power assist for steering according to the signal. Thus, the logic controls to adjust the power assist for steering according to the signal of the tilt sensor, that is, a tilted extent of the steering column.

Therefore, when the steering column is tilted upward, the power assist for steering is weakly provided to the tilted extent. By contrast, when the steering column is tilted downward, the power assist for steering is strongly provided to the tilted extent. Thereby, the power steering system is controlled. Here, the degree adjusting the power assist for steering is determined according to how many tilt positions the tilt system of the steering column can provide.

FIG. 1 shows one embodiment of the invention. The embodiment shown in FIG. 1 provides a power assist for steering in three steps. To be more specific, the embodiment of FIG. 1 is designed so that a low power assist for steering is provided when a steering column is tilted upward, that a middle power assist for steering is provided when a steering column is located at a middle position, and that a high power assist for steering is provided when a steering column is tilted downward.

Meanwhile, controlling of the power assist for steering by a control logic of the control unit may be applied only when a speed of a vehicle is below a predetermined speed. Thus, when the vehicle travels at a high speed, the power assist for steering is equally controlled regardless of the a tilt angle of the steering column. This is because it is more important to secure traveling stability at the high speed.

According to the invention, the electronic control power steering is capable of differentiating the power assist for steering according to a condition of driver's body. This provides not only an effect of making usage convenient, but also an effect of using energy effectively.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An electronic control power steering having a control unit for electronic control, comprising:
    a tilt sensor that detects a tilt angle of a steering column; and
    a controller comprising a power adjuster which is configured to adjust a power assist supplied to the steering column based upon a tilt angle of the steering column detected by the tilt sensor, wherein the tilt angle of the steering column corresponds to a signal outputted by the tilt sensor and received by the controller.

2. The electronic control power steering as claimed in claim 1, wherein the controller is configured to adjust the power assist supplied to the steering column when a vehicle is below a predetermined speed.

3. The electronic control power steering as claimed in claim 1, wherein when the steering column is tilted upward the power assist supplied to the steering column is decreased.

4. The electronic control power steering as claimed in claim 1, wherein when the steering column is tilted downward a power assist supplied to the steering column is increased.

5. The electronic control power steering as claimed in claim 1, wherein when the steering column is tilted upward the power assist supplied to the steering column is decreased and when the steering column is tilted downward a power assist supplied to the steering column is increased.

* * * * *